(12) United States Patent
Aoki

(10) Patent No.: US 11,456,692 B2
(45) Date of Patent: Sep. 27, 2022

(54) SEMICONDUCTOR DEVICE AND MOTOR CONTROL METHOD

(71) Applicant: RENESAS ELECTRONICS CORPORATION, Tokyo (JP)

(72) Inventor: Naohiko Aoki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 126 days.

(21) Appl. No.: 17/032,805

(22) Filed: Sep. 25, 2020

(65) Prior Publication Data

US 2021/0126571 A1 Apr. 29, 2021

(30) Foreign Application Priority Data

Oct. 28, 2019 (JP) .............................. JP2019-195149

(51) Int. Cl.
| | |
|---|---|
| *H02P 1/32* | (2006.01) |
| *H02P 3/20* | (2006.01) |
| *H02P 7/06* | (2006.01) |
| *H02P 29/028* | (2016.01) |
| *H02P 27/08* | (2006.01) |
| *H02P 25/22* | (2006.01) |

(52) U.S. Cl.
CPC ............ *H02P 29/028* (2013.01); *H02P 25/22* (2013.01); *H02P 27/08* (2013.01)

(58) Field of Classification Search
CPC ......... H02P 29/028; H02P 25/22; H02P 27/12
USPC .......................................................... 318/496
See application file for complete search history.

(56) References Cited

U.S. PATENT DOCUMENTS

| | | | |
|---|---|---|---|
| 2019/0081585 A1* | 3/2019 | Nakamura | ............... H02P 25/22 |
| 2019/0363664 A1* | 11/2019 | Nakamura | ............ B62D 5/0463 |
| 2020/0047791 A1* | 2/2020 | Niwa | ...................... B62D 5/005 |
| 2020/0083797 A1* | 3/2020 | Saijo | ........................ H02P 5/00 |
| 2020/0331517 A1* | 10/2020 | Toko | ....................... H02P 27/06 |
| 2021/0075301 A1* | 3/2021 | Ichikawa | ............... H02K 11/33 |
| 2021/0362771 A1* | 11/2021 | Ichikawa | ............... B62D 5/046 |

OTHER PUBLICATIONS

A. Satake et al., "Design of Coupling Cancellation Control for a Double-winding PMSM", IEEJ Journal of Industry Applications, vol. 6, No. 1, Jun. 13, 2016, pp. 29-35.

\* cited by examiner

*Primary Examiner* — Erick D Glass
(74) *Attorney, Agent, or Firm* — McDermott Will & Emery LLP

(57) ABSTRACT

A semiconductor device for controlling a three-phase motor with double windings, includes a first inverter that drives a first winding of the three-phase motor, a second inverter that drives a second winding of the three-phase motor and a communication line between the first and second inverters. The first and second inverters, through the communication line, notify a respective operation state each other.

11 Claims, 11 Drawing Sheets

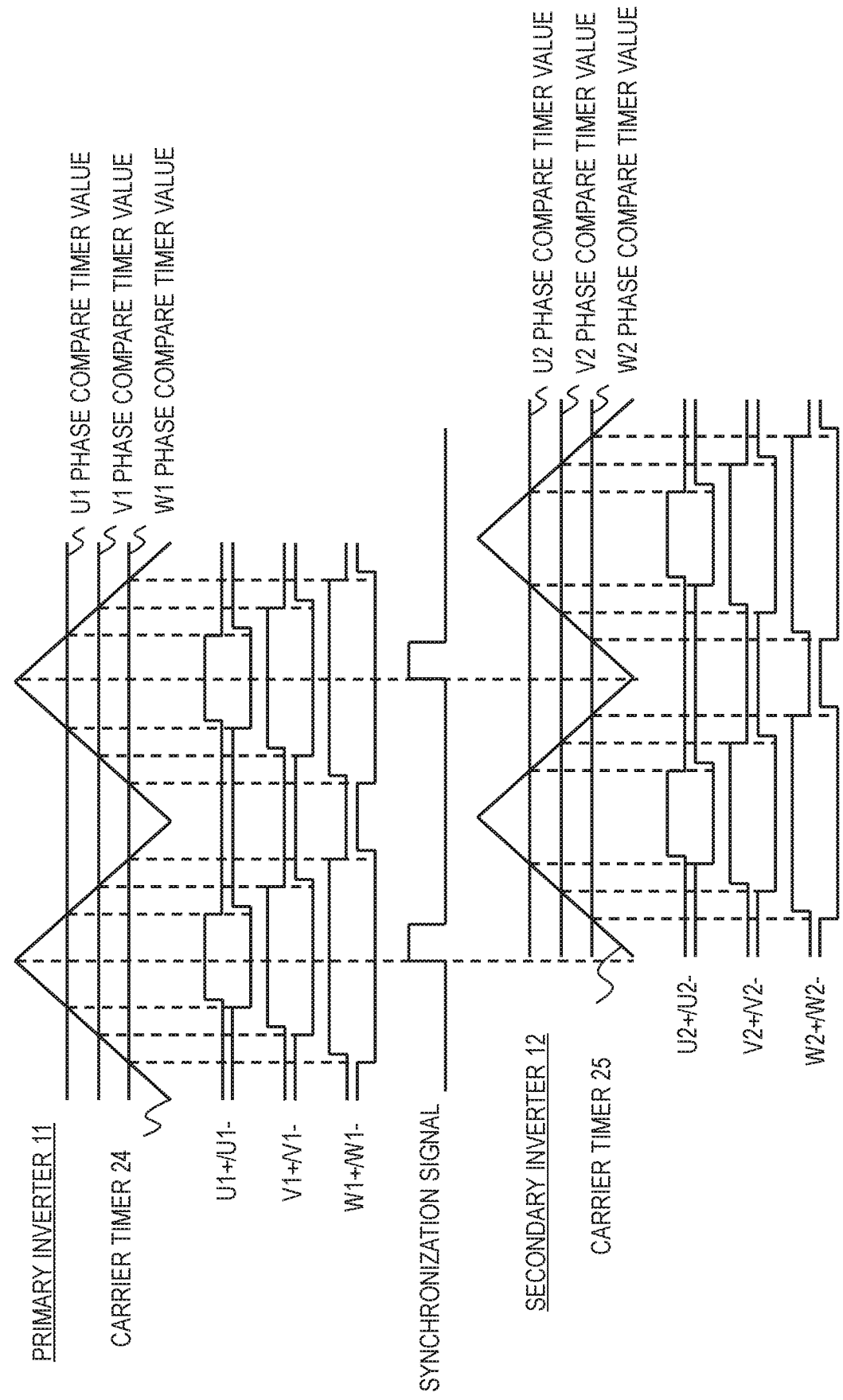

SEMICONDUCTOR DEVICE AND MOTOR CONTROL METHOD

CROSS-REFERENCE TO RELATED APPLICATIONS

The disclosure of Japanese Patent Application No. 2019-195149 filed on Oct. 28, 2019 including the specification, drawings and abstract is incorporated herein by reference in its entirety.

BACKGROUND

The present invention relates to a motor control device of a motor, particularly a motor control technique with a double winding construction.

In recent years, motors have become widely used for driving automobiles, such as electric and hybrid cars.

Two problems to be solved are presented for motors used in the automotive field. One of them is that large torque can be obtained with low power. The other is the countermeasure in the case of failure.

To solve the above two problems, a motor of the double winding is known. Non-Patent Document 1 describes a double winding motor and its control circuits, not for automobiles (FIG. 1). In the configuration of FIG. 1, two sets of three-phase stator are used, and a phase difference between the two sets is 0. Further, a current is passed through the inverter to the respective windings (coils).

PRIOR-ART DOCUMENT

Non-Patent Document

[Non-Patent Document 1] Akira Satake, two others, "Design of Coupling Cancellation Control for a Double-winding PMSM," IEEJ Journal IA, Vol. 6, No. 1, 2017

SUMMARY

Although a current control method considering the interference between the double windings is described in Non-Patent Document 1, there is no description of a specific control circuit. In particular, in an in-vehicle ECU (Electronic Control Unit), it is essential to implement countermeasures (functional safety) in consideration of failures.

Other objects and novel features will become apparent from the description of the specification and drawings.

Means of Solving the Problems

Semiconductor device according to an embodiment includes a first (primary) inverter for controlling a first winding of the motor and a second (secondary) inverter for controlling a second winding of the motor, the primary inverter and the secondary inverter are coupled by a communication line, and the primary inverter performs operation settings of the primary inverter and the secondary inverter based on an operation status of the secondary inverter transmitted by the communication line.

In semiconductor device according to an embodiment, power conversion can be performed with inrush current measures.

BRIEF DESCRIPTION OF THE DRAWINGS

FIG. 11 is an operation explanatory diagram of a semiconductor device in accordance with the third embodiment.

DETAILED DESCRIPTION

Figure 1:
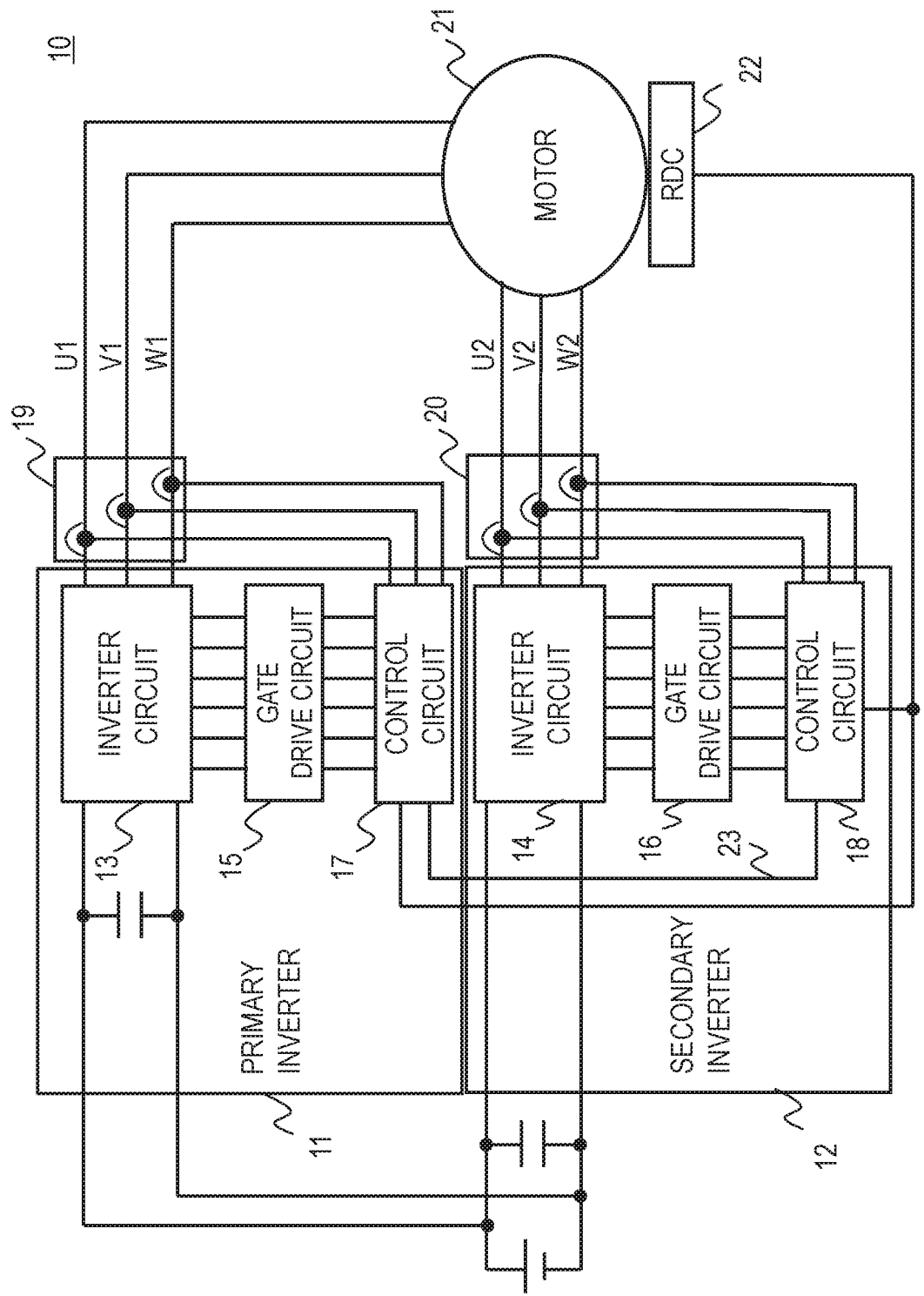
FIG. 1 is a schematic diagram of a semiconductor device according to a first embodiment.

Hereinafter, a semiconductor device according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments may be arbitrarily combined with each other.

First Embodiment

FIG. 1 is a block diagram showing a configuration of a semiconductor device 10 according to first embodiment.

Figure 2:
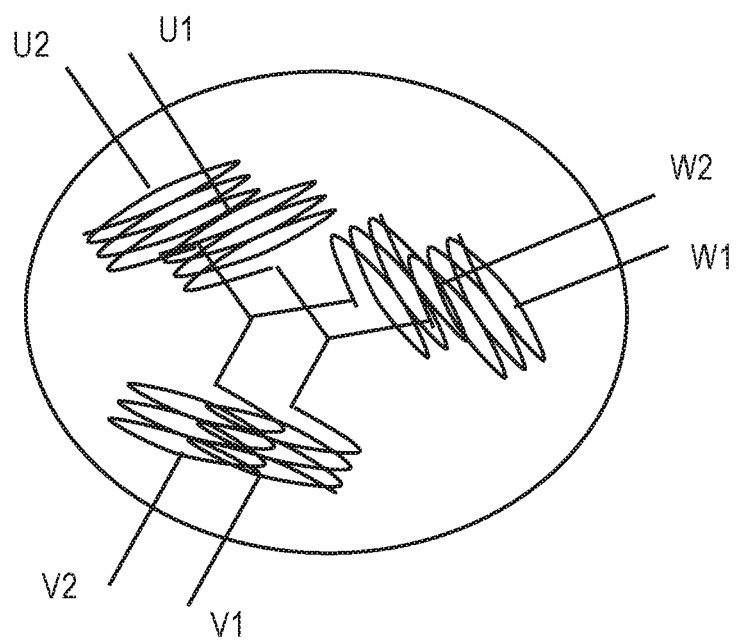
FIG. 2 is an image diagram of a motor according to the first embodiment.

As shown in FIG. 1, semiconductor device 10 includes a first inverter 11 (hereinafter, referred to as the primary inverter 11) and a second inverter 12 (hereinafter, referred to as the secondary inverter 12). FIG. 2 is an image diagram of a motor 21 controlled by semiconductor device 10. Motor 21 of the first embodiment is a three-phase motor having three slots at intervals of 120 degrees. However, the structure has two windings in one slot. Each of windings has U-phase (U1 phase, U2 phase), V-phase (V1 phase, V2 phase), and W-phase (W1 phase, W2 phase).

Referring back to FIG. 1, the configuration of semiconductor device 10 will be further described. Primary inverter 11 is coupled to the U1, V1, W1 phase of the motor 21, generates a three-phase drive current. In generation of the three-phase drive current, a current flowing through each of the U1, V1, W1 phases, and a rotational angle of the motor outputted from RDC (Resolver Digital Converter) 22 are referred. The secondary inverter 12 is also similarly coupled to the U2, V2, W2 phases, and generates a three-phase drive current.

The primary inverter 11 includes an inverter circuit 13, a gate drive circuit 15, and a control circuit 17. The secondary inverter 12 likewise includes an inverter circuit 14, a gate drive circuit 16, and a control circuit 18.

Control circuit 17 controls the motor 21 based on current flowing in the U1, V1, W1 phases detected by current detection circuit 19 and the rotation angle of the motor 21 outputted from RDC 22 so that the motor 21 performs the desired rotation. A vector control method or the like is used as the motor control method, but the details thereof will be omitted. Similarly, the control circuit 18 controls the motor 21 based on current flowing in the U2, V2, W2 phases detected by the current detection circuit 20 and the rotation angle of the motor 21 outputted from RDC 22 so that the motor 21 performs the desired rotation. Further, the control circuit 17 and the control circuit 18 is connected by a communication line 23. By knowing a control state of motor 21 each other, the control circuits 17 and 18 can change the control method. The details will be described later. Each of the control circuits 17, 18 may be a microcontroller or a dedicated circuit. An A/D converter (not shown) is used to measure currents flowing in the U1, U2, V1, V2, W1, W2 phases.

Figure 3:
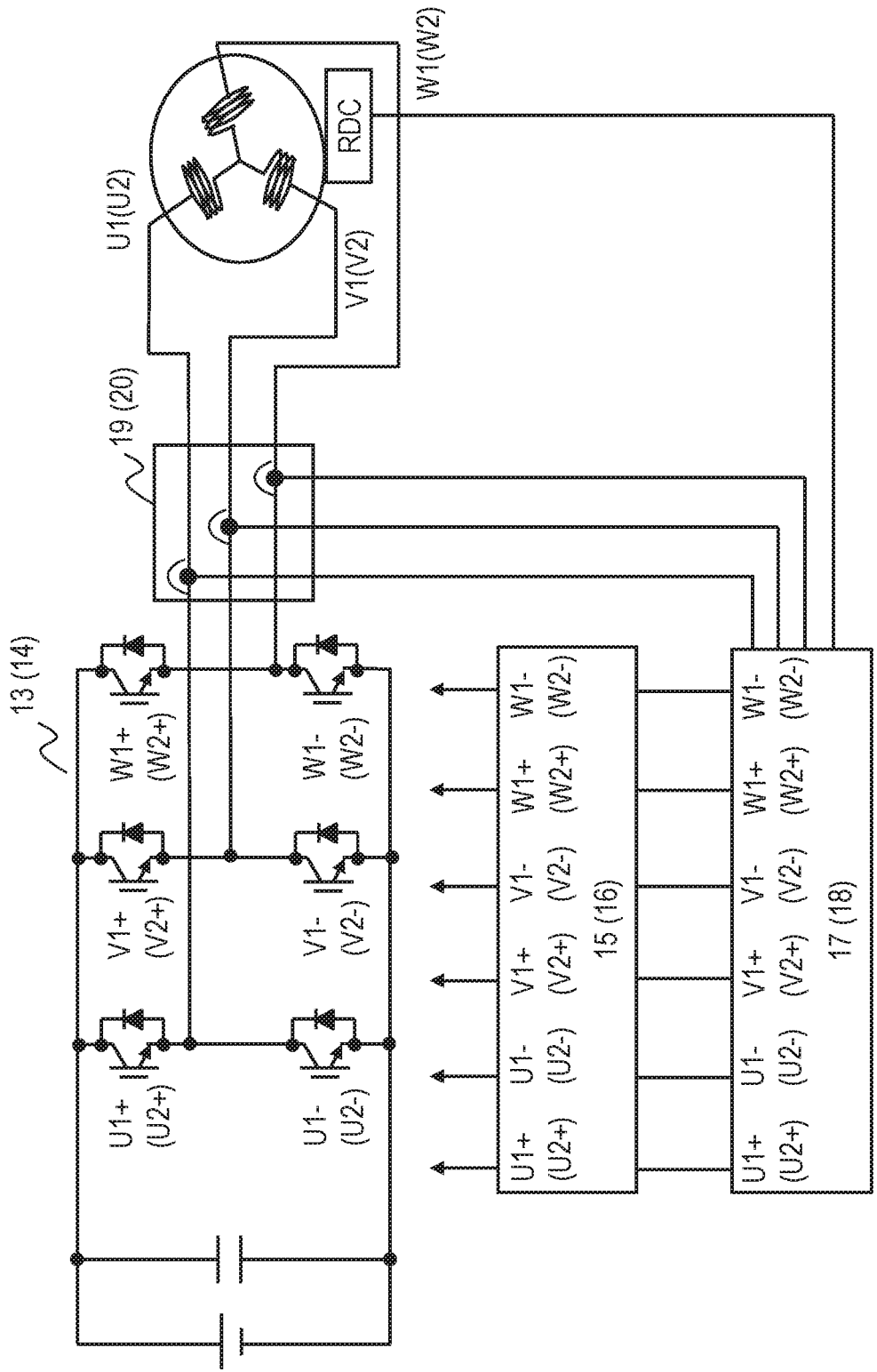
FIG. 3 is a schematic diagram of the semiconductor device according to the first embodiment.

Inverter circuit 13 and the inverter circuit 14 are the same circuit configuration. FIG. 3 shows the configuration of the inverter circuit 13. Symbols in parentheses of FIG. 3 show the configuration of the inverter circuit 14. Inverter circuit 13 includes six power transistors U1+, U1−, V1+, V1−, W1+, W1− (IGBTs or power MOS transistors) as shown in FIG. 3. Power transistors U1+, U1− are coupled to the U1 phase of the motor 21. Power transistor V1+, V1− are coupled to the V1 phase of the motor 21. Power transistors W1+, W1− are coupled to the W1 phase of the motor 21. In inverter circuit 14 as well, the power transistors U2+, U2− are coupled to the U2 phase of the motor 21. Power transistors V2+, V2− are coupled to the V2 phase of the motor 21. Power transistors W2+, W2− are coupled to the W2 phase of the motor 21.

Gate drive circuit 15, based on control signals from the control circuit 17, generates gate signals for the six power transistors in the inverter circuit 13. The gate drive circuit 16 likewise generates gate signals for the six transistors in the inverter circuit 14 based on control signals from the control circuit 18. Inverter circuit 13, based on the gate signals from the gate drive circuit 15, generates signals for U1, V1, W1 phases. Inverter circuit 14 likewise, based on the gate signals from the gate drive circuit 16, generates signals for U2, V2, W2 phases.

Figure 4:
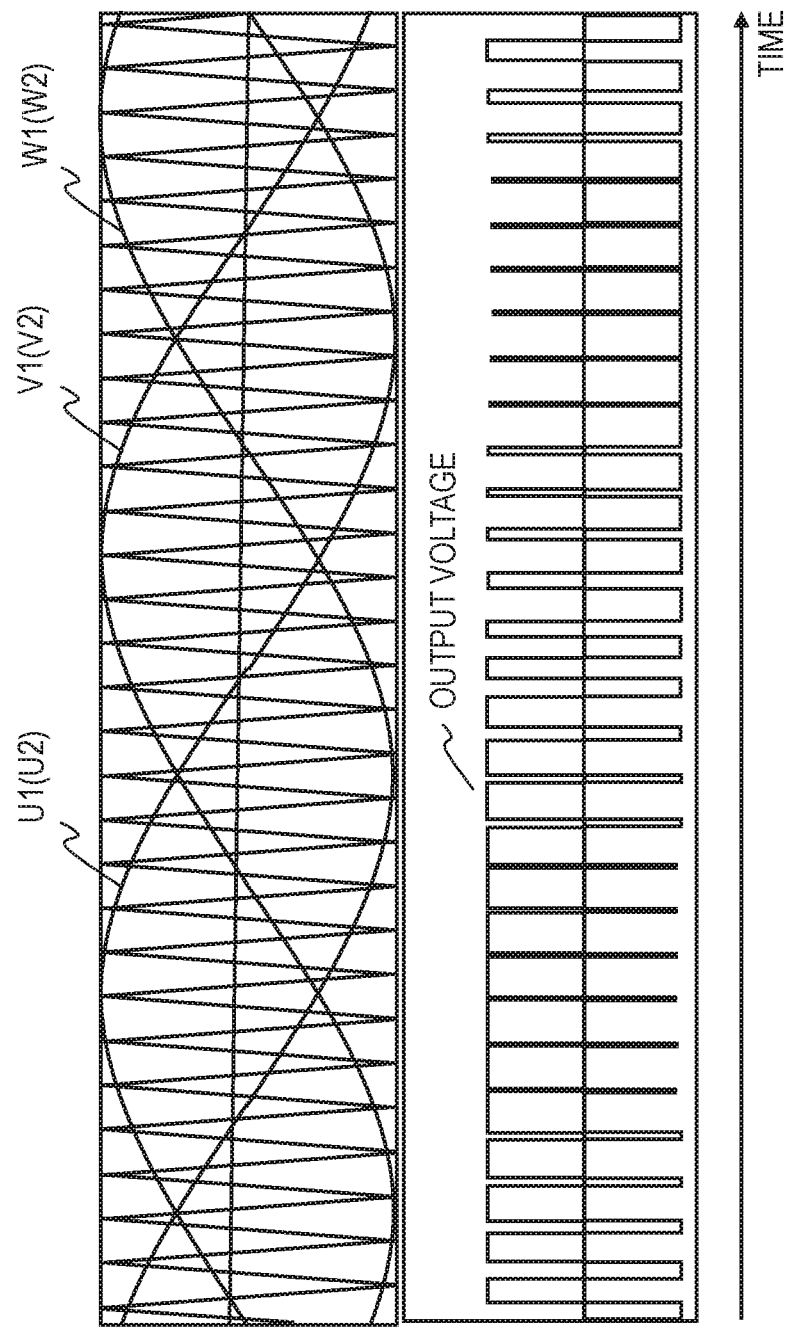
FIG. 4 is an explanatory diagram of a sine wave control of a motor in accordance with the first embodiment.

Here, 3-phase motor control method will be described with reference to FIGS. 3 and 4. U1 (U2), V1 (V2), and W1 (W2) in FIG. 4 indicate current waveforms by sine wave driving. The motor control is performed by the three-phase U1 (U2), V1 (V2), W1 (W2) drive current in the form of sine waves whose phases are shifted by 120 degrees. In first embodiment, a motor control by PWM (Pulse Width Modulation) is performed for sinusoidal drive. The waveform of the output voltage in FIG. 4 shows the output voltage of U1 (U2) phase controlled by PWM.

Figure 5:
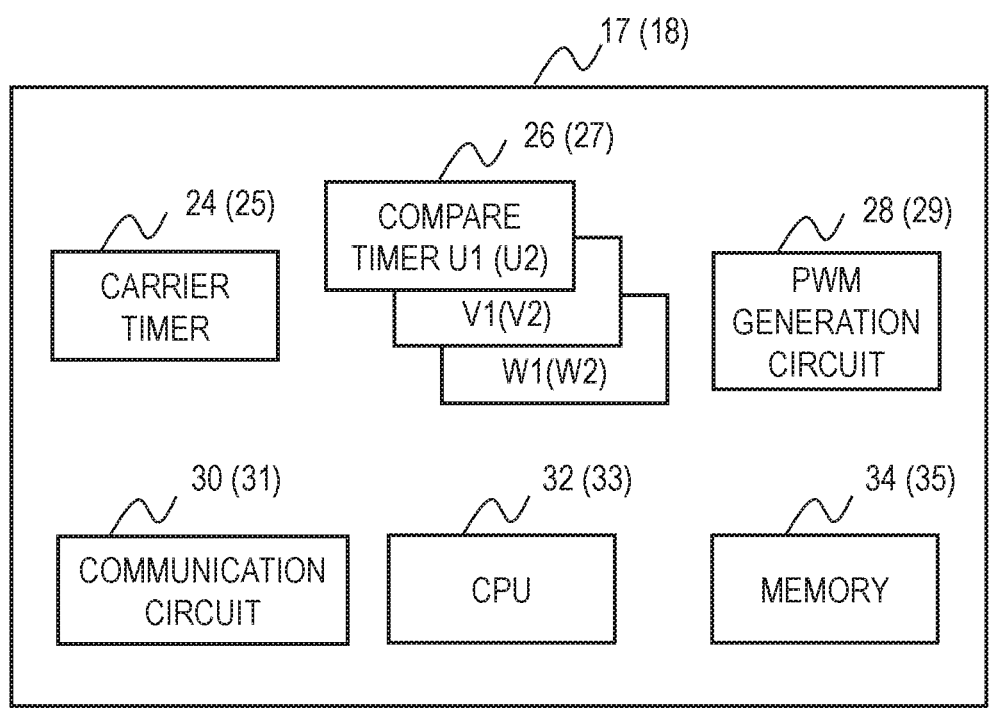
FIG. 5 is an explanatory diagram of a control circuit according to the first embodiment.

Next, the PWM control will be described. FIG. 5 is a block diagram of the control circuits 17 and 18. Control circuit 17 and the control circuit 18 are the same circuit configuration. The control circuit 17 includes a carrier timer 24, a compare timer 26, PWM generation circuit 28, a communication circuit 30, CPU 32, and memory 34. Similarly, the control circuit 18 includes a carrier timer 25, compare timer 27, PWM generation circuit 29, the communication circuit 31, CPU 33, and memory 35.

Figure 6:
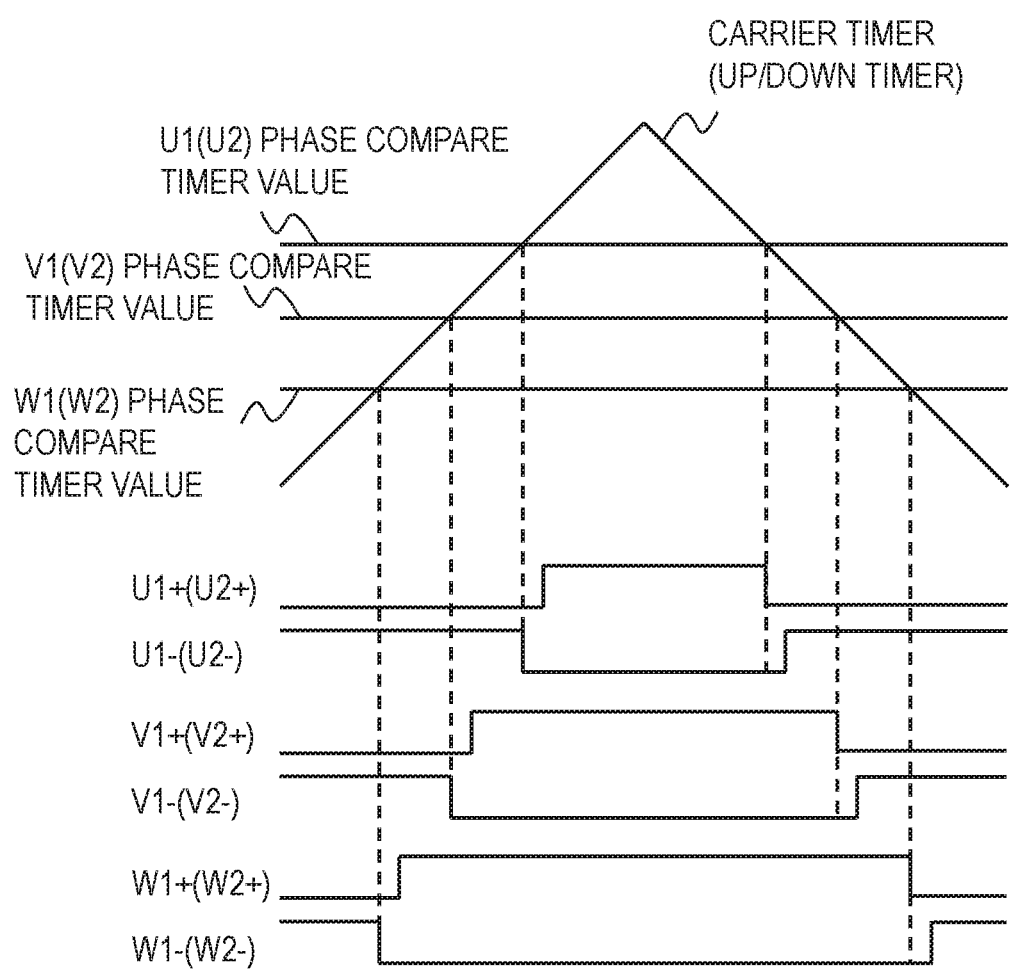
FIG. 6 is an explanatory diagram of a PWM control according to the first embodiment.

Control circuit 17, 18 control the output currents of the U1, U2, V1, V2, W1, W2 phases based on the current instruction (torque) value from software or the like for motor control. Control circuit 17, so that the output current for each phase is a desired value, generates control signals (PWM signals) for the power transistors U1+, U1−, V1+, V1−, W1+, W1− in the inverter circuit 13. More specifically, each control signal, as shown in FIG. 6, is generated by a comparison operation between the carrier timer 24 and the U1, V1, W1 phase compare timer values. The carrier timer 24 is a timer that counts up from a zero value to a predetermined value at a predetermined cycle, for example, a clock cycle, and counts down from the predetermined value to the zero value at the predetermined cycle. Based on the current instruction value, by changing the compare timer value of each phase, it is possible to vary each control signal. Control circuit 18 also in the same manner generates control signals (PWM signals) for the power transistors U2+, U2−, V2+, V2−, W2+, W2−.2 5

Gate drive circuit 15, from each control signal outputted by control circuit 17, generates gate signals for power transistors (U1+, U1−, V1+, V1−, W1+, W1−) in the inverter circuit 13. Since the six transistors consist of IGBT and power MOSs, the gate signals should be high voltages. Thus, the gate drive circuit 15 uses a charge pump (not shown) to generate the high voltage gate signals from the control signals. Gate drive circuit 16 likewise, from each control signal outputted by control circuit 18, generates gate signals for the six power transistors (U2+, U2−, V2+, V2−, W2+, W2−) in the inverter circuit 14.

Figure 7:
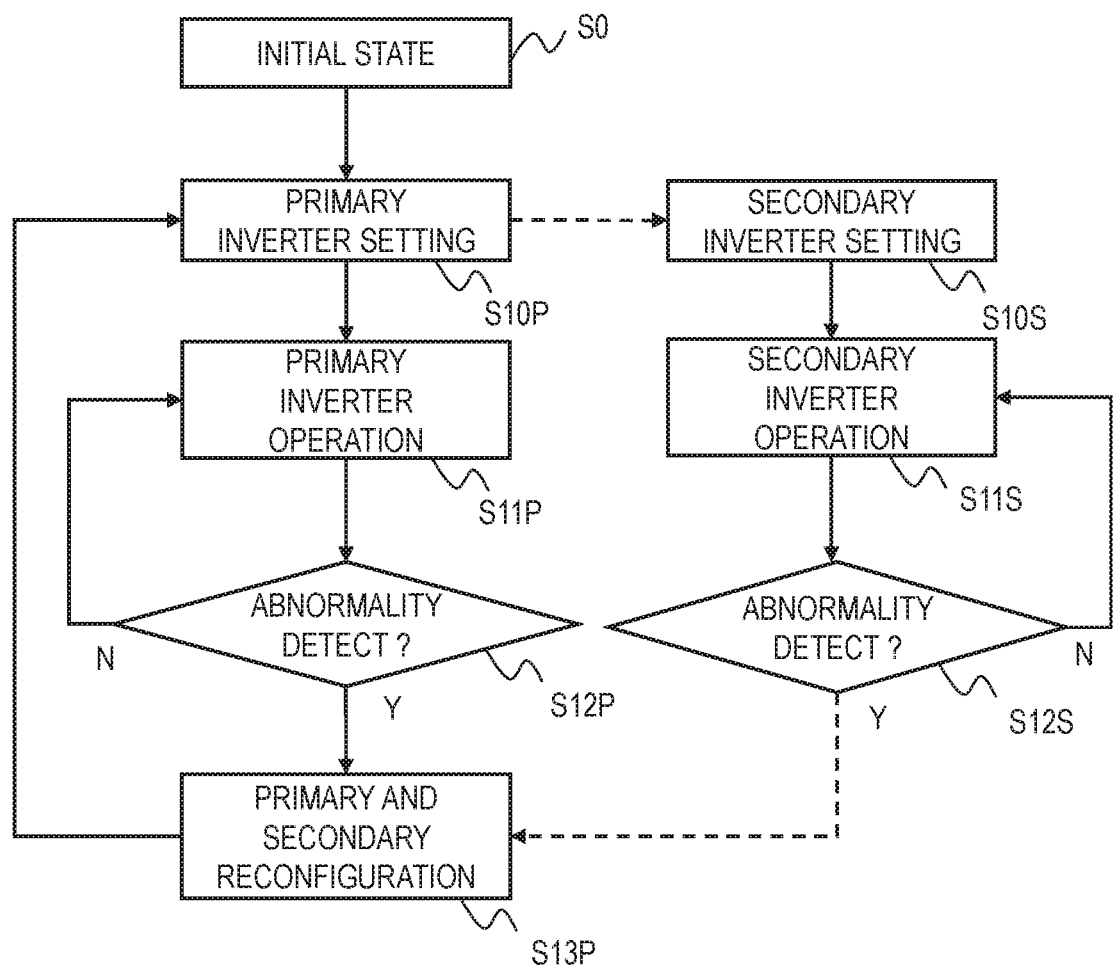
FIG. 7 is an operation flow chart of the semiconductor device according to the first embodiment.

Next, the operation of semiconductor device 10 according to first embodiment will be described. FIG. 7 is a flow chart showing the operation of semiconductor device 10.

First, in the initial stage, one of the inverters is set as a primary inverter and the other is set as a secondary inverter. This setting may be determined in advance by fixed values for the two inverters, or may be determined dynamically by another MCU (Micro Control Unit).

When control circuit 17 of the primary inverter 11, according to instructs from software or the like for motor control, receives a command value to the motor (torque command value or the like), the control circuit 17 sets the primary inverter 11 and sets the secondary inverter 12 through the communication line 23 to match the command value (steps S10p, S10s, S11p, S11s).

For example, it is assumed that a current of 100 A needs to be supplied to each of the U phase, V phase and W phase in accordance with the command value. Primary inverter 11 is set so that a current of 50 A is supplied to each of the U1, V1, and W1 phases. Further, the secondary inverter 12 is set so that the current of 50 A is supplied to each of the U2, V2, W2 phases. This is the case where 1:1 is preset in the primary inverter 11 and the secondary inverter 12. Note that the ratio is not limited to 1:1.

Here, it is assumed that a failure occurs when the primary inverter 11 and the secondary inverter 12 are in operation in accordance with the command value (step S12p, S12s). For example, if the failure such as a short circuit occurs in the secondary inverter 12 or in the connection line between the secondary inverter 12 and the motor, the secondary inverter 12 notifies the primary inverter 11 of the failure through the communication line 23. Here, the failure in the secondary inverter 12 is detected by test circuits (not shown) in the control circuit 18 and the gate drive circuit 16, and also detected by output information from the current detection circuit 20.

When the primary inverter 11 receives the failure from the secondary inverter 12, the primary inverter 11 notifies the external MCU and changes the settings of the primary inverter 11 and the secondary inverter 12 (step S13p). Here, since the failure occurs in the secondary inverter 12, the primary inverter 11 stops the operation of the secondary inverter 12, so that the subsequent motor control is performed only by the primary inverter 11. In the example of 100 A described above, the primary inverter 11 performs control so that a current of 100 A flows in each of the U1, V1, and W1 phases. In first embodiment, since there are a winding controlled by the primary inverter 11 and a winding controlled by the secondary inverter 12 in one slot, it is possible to continue the motor control by only the primary inverter 11.

Similarly, if a failure is detected in the primary inverter 11, motor control can be continued by only the secondary inverter 12.

If a failure is detected in the control circuit 17 of the primary inverter 11, the motor control continues by changing the setting of the secondary inverter 12 as the primary inverter.

In first embodiment, two windings are used in one of the slots, but the present invention is not limited thereto. There may be three windings in one slot. In this case, a tertiary inverter having the same configuration as the primary inverter 11 and the secondary inverter 12 is added.

As described above, in semiconductor device 10 according to first embodiment, when controlling a motor having a plurality of windings in one slot, an inverter, a gate drive circuit, and a control circuit are provided in each winding. Further, a plurality of control circuits is coupled to each other by a communication line, and each abnormal state is communicated with each other. Thus, it is possible to continue the motor control even if a failure occurs in the inverter circuit, the gate drive circuit, and the control circuit.

Second Embodiment

Figure 8:
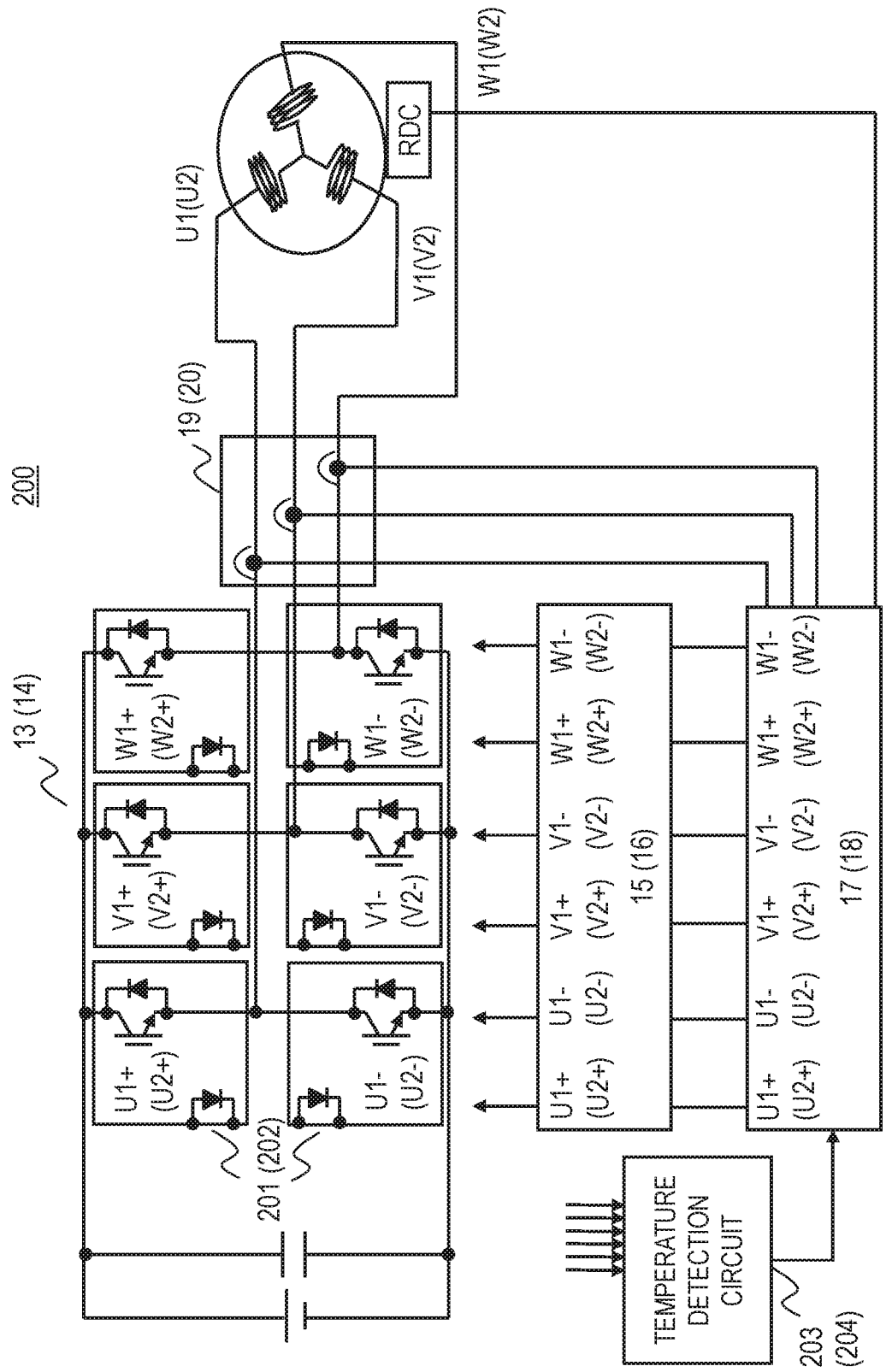
FIG. 8 is a diagram of a semiconductor device according to a second embodiment.

FIG. 8 is a block diagram showing a configuration of a semiconductor device 200 according to second embodiment.

Compared to semiconductor device 10, in semiconductor device 200, temperature detection elements (diodes) 201, 202 are added for the six power transistors of each of the primary inverter 11 and the secondary inverter 12. Further, the temperature detection circuits 203, 204 for converting temperature information from voltages of the temperature detection elements 201, 202 are also added. Each of temperature detection circuits 203 and 204 is constituted by an A/D converter, and a conversion table for converting the temperature information from the voltage value. Alternatively, each of the temperature detection circuits 203, 204 is the A/D converter and converting the temperature information from the voltage value may be performed by the control circuits 17, 18.

Figure 9:
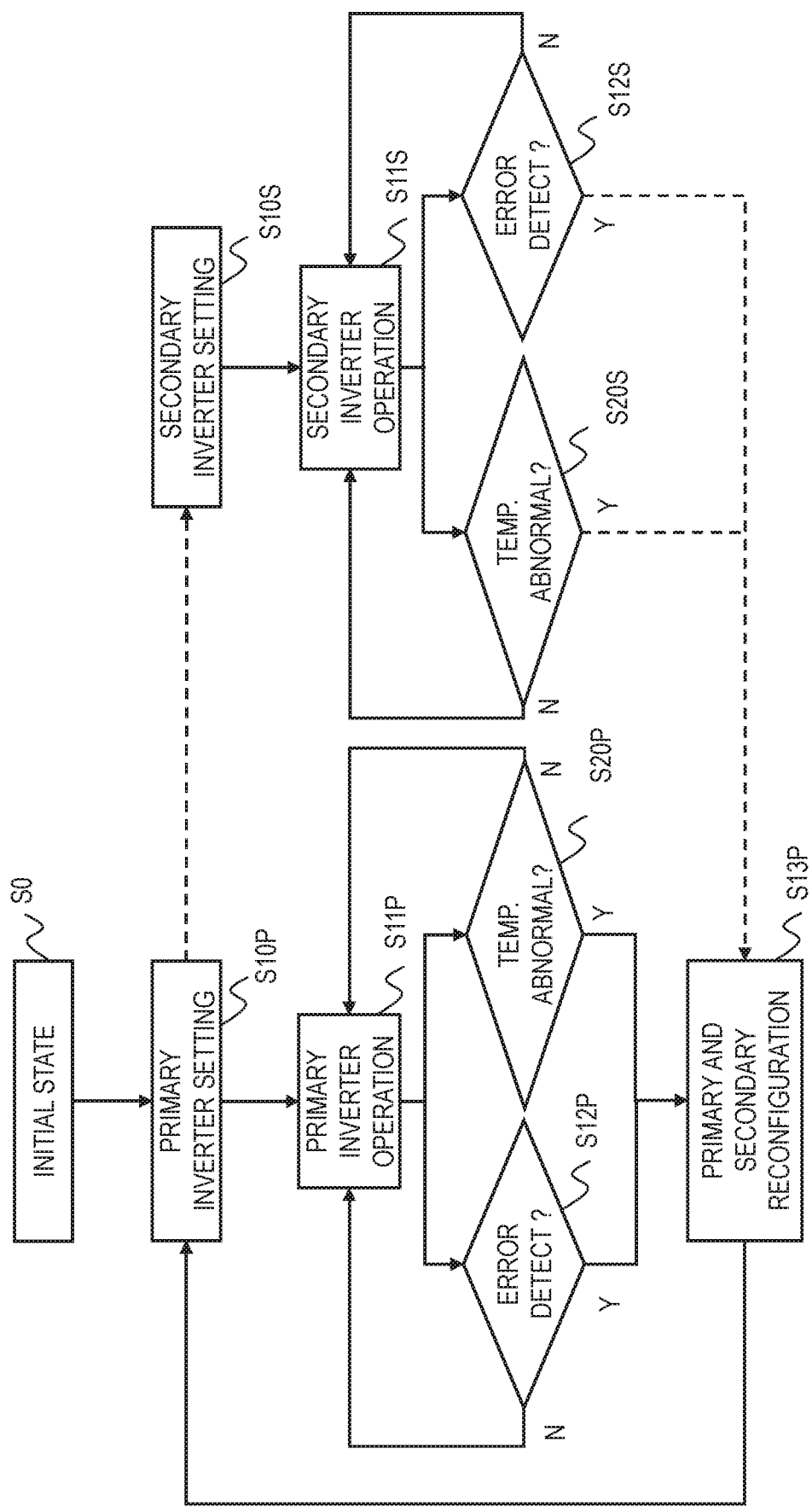
FIG. 9 is an operation flow chart of the semiconductor device according to the second embodiment.

Next, the operation of semiconductor device 200 according to the second embodiment will be described. FIG. 9 is a flow chart illustrating the operation of semiconductor device 200.

In the second embodiment, a temperature-verification (steps S20$p$, S20$s$) is added to the first embodiment operation flow (FIG. 6). Since steps S0 and S10$p$, S10$s$, S11$p$, S11$s$ are the same as first embodiment, the explanation will be omitted.

After the setting of the primary inverter 11 and the secondary inverter 12 is completed, the motor control is performed by instructions and vector control from the software for motor control (steps S10$p$, S10$s$, S11$p$, S11$s$). During control operation, the primary inverter 11 and the secondary inverter 12 observe the temperature of the respective power transistors using the temperature detection elements 201, 202 and temperature detection circuits 203, 203. The secondary inverter 12 also notifies the primary inverter 11 of the observation results through the communication line 23.

The control circuit 17 of the primary inverter 11 performs temperature verification for the observed temperature (Tp) of the primary inverter 11 and the observed temperature (Ts) of the secondary inverter 12 (steps S20$p$, S20$s$). Specifically, each of Tp and Ts is compared with a predetermined threshold temperature.

If Tp or Ts exceeds the threshold temperature as a result of the temperature verification, the settings of the primary inverter 11 and the secondary inverter 12 are changed (step S13$p$). For example, a case where Ts exceeds a threshold temperature will be described. First, as described in the first embodiment, it is assumed that the current command value is 100 A. Until Ts exceeds the threshold temperature, the primary inverter 11 performs control so that the current of 50 A flows in each of the U1, V1, W1 phases and the secondary inverter 12 performs control so that the current of 50 A flows in each of the U2, V2, W2 phases. When Ts exceeds the threshold temperature, the primary inverter 11 changes the settings so that the current of the secondary inverter 12 decreases and the current of the primary inverter 11 increases. As an example, the settings are changed so that 40 A flows in each of the U1, V1, W1 phases and GOA flows in each of the U2, V2, and W2 phases.

The setting change information of the primary inverter 11 and the secondary inverter 12 may be, for example, stored as a table a relationship between the threshold temperature and the current in the memory 34 of the control circuit 17 of the primary inverter 11. Depending on the detected temperature, the current ratio controlled by the primary inverter 11 and the secondary inverter 12 may be changed, such as 1:1, 3:2, 2:1.

After the setting change in the step S13$p$, the primary inverter 11 and the secondary inverter 12 continues the temperature verification. Since operation currents of the secondary inverter 12 are reduced by the setting change, the temperatures of the power transistors are lowered. As a result, if Ts falls below the threshold temperature, the primary inverter 11 again changes the settings of the primary inverter 11 and the secondary inverter 12. That is, the primary inverter 11 performs control so that the current of 50 A flows in each of the U1, V1, W1 phases and the secondary inverter 12 performs control so that the current of 50 A flows in each of the U2, V2, W2 phases.

As described above, in semiconductor device 200 according to the second embodiment, a temperature detection elements are provided in the inverters so that the temperature information of the inverter circuit can be notified between the primary inverter and the secondary inverter. In addition, the primary inverter enables the operation settings of the primary inverter and the secondary inverter in consideration of the temperature information of the inverters. Thus, it is possible to prevent failures due to abnormal temperatures of the inverters and to continue the motor control.

Third Embodiment

The configuration of semiconductor device according to the third embodiment is the same as semiconductor device 10 in FIG. 1. However, the operations of the control circuits 17, 18 are different.

Figure 10:
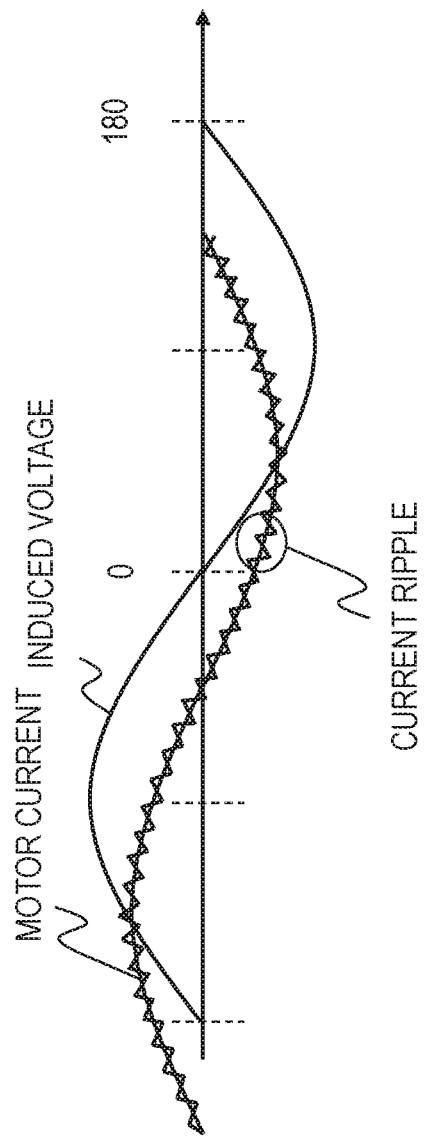
FIG. 10 is an explanatory diagram of current waveforms of motor control according to a third embodiment.

Prior to explaining the operation of semiconductor device according to the third embodiment, it will be described phenomena occurring in the three-phase current. FIG. 10 is an image diagram of a phenomenon occurring in the current of one phase of the three phases. Back electromotive force by a coil is generated because the coil is used for the motor. The effect of this back electromotive force causes current ripple in the current to drive the motor. The current ripple causes vibration and noise of the motor.

In the case of motor with two windings in one slot, if the currents flowing through the two windings are not perfectly synchronized, there is a possibility of generating a current ripple in the other winding due to the influence of one winding. However, perfect synchronization is difficult.

Therefore, in the third embodiment, in order to reduce the current ripple as much as possible, the driving current generation timings of the U1, V1, W1 phases by the primary inverter 11 are shifted from the driving current generation timings of the U2, V2, W2 phases by the secondary inverter 12 by a predetermined amount. By shifting the generation timing, the timings at which the current ripples occur are dispersed, it is possible to suppress an occurrence of a large current ripple.

A more specific description will be given with reference to FIG. 11. As described in FIG. 6, the control circuit 17 of the primary inverter 11 and the control circuit 18 of the secondary inverter 12 perform PWM control based on the carrier timer. In the third embodiment, the control circuit 17 of the primary inverter 11 notifies the secondary inverter 12 through the communication line 23 when the carrier timer 24 reaches a peak value. The secondary inverter 12 receives the notification from the primary inverter 11 and starts the operation of the carrier timer 25.

Since operations of the carrier timer 24 of the primary inverter 11 and the carrier timer 25 of the secondary inverter 12 are shifted, the driving current generation timings of the U1, V1, W1 phases by the primary inverter 11 can be shifted from the driving current generation timings of the U2, V2, W2 phases by the secondary inverter 12.

The amount of displacement between the primary inverter 11 and the secondary inverter 12 is not limited thereto. For example, it is possible to shift an arbitrary amount by specifying a timer value of the carrier timer 24.

As described above, in semiconductor device according to the third embodiment, the generation timing of the three-phase drive current is shifted between the primary inverter and the secondary inverter. Thus, it is possible to disperse the current ripple generated in the winding, it is possible to suppress the vibration and noise of the motor.

It should be noted that the present invention is not limited to the above-mentioned embodiments, and various modifications can be made without departing from the gist thereof.

What is claimed is:

1. A semiconductor device for controlling a three-phase motor with double windings, the semiconductor device comprising:
a first inverter that drives a first winding of the three-phase motor;
a second inverter that drives a second winding of the three-phase motor; and
a communication line between the first and second inverters,
wherein the first and second inverters, through the communication line, notify a respective operation state each other,
wherein the first inverter includes a first control circuit,
wherein the first control circuit, based on the operation state of the second inverter notified through the communication line, changes a drive current of the first winding, and
wherein when the second inverter is in an abnormal state, the first control circuit adds a drive current to be flowed in the second winding by the second inverter to the drive current of the first winding.

2. A semiconductor device for controlling a three-phase motor with double windings, the semiconductor device comprising:
a first inverter that drives a first winding of the three-phase motor;
a second inverter that drives a second winding of the three-phase motor; and
a communication line between the first and second inverters,
wherein the first and second inverters, through the communication line, notify a respective operation state each other,
wherein the first inverter includes a first control circuit,
wherein the first control circuit, based on the operation state of the second inverter notified through the communication line, changes a drive current of the first winding,
wherein the first inverter further includes a first temperature detection circuit,
wherein the second inverter includes a second control circuit and a second temperature detection circuit, and
wherein the first and second control circuits change the respective drive currents of the first and second windings in accordance with temperatures indicated by the first and second temperature detection circuits.

3. The semiconductor device according to claim 2, wherein the first and second control circuits control the drive current of the first winding and the drive current of the second winding so that a ratio of the drive current of the first winding and the drive current of the second winding is a predetermined ratio in accordance with the temperatures indicated by the first and second temperature detection circuits.

4. A semiconductor device for controlling a three-phase motor with double windings, the semiconductor device comprising:
a first inverter that drives a first winding of the three-phase motor;
a second inverter that drives a second winding of the three-phase motor; and
a communication line between the first and second inverters,
wherein the first and second inverters, through the communication line, notify a respective operation state each other,
wherein the first inverter includes a first control circuit,
wherein the first control circuit, based on the operation state of the second inverter notified through the communication line, changes a drive current of the first winding,
wherein the first inverter further includes a first PWM (Pulse Width Modulation) generation circuit and a first power transistor,
wherein the second inverter further includes a second PWM generation circuit and a second power transistor,
wherein the drive current of the first winding is generated by controlling a gate of the first power transistor by a PWM signal generated by the first PWM generation circuit, and
wherein the drive current of the second winding is generated by controlling a gate of the second power transistor by a PWM signal generated by the second PWM generation circuit.

5. The semiconductor device according to claim 4, wherein a timing at which the first PWM generation circuit generates the PWM signal and a timing at which the second PWM generation circuit generates the PWM signal is shifted by a predetermined amount.

6. The semiconductor device according to claim 5,
wherein the first inverter further includes a first carrier timer that counts up or down at predetermined cycles and a first compare timer,
wherein the second inverter further includes a second carrier timer that counts up or down at predetermined cycles and a second compare timer,
wherein the first PWM generation circuit generates the PWM signal by comparing a value of the first carrier timer with a value of the first compare timer,
wherein the second PWM generating circuit generates the PWM signal by comparing a value of the second carrier timer with a value of the second compare timer, and
wherein a timing at which the first carrier timer counts up and a timing at which the second carrier timer counts up are shifted by a predetermined amount.

7. A motor control method for controlling a three-phase motor with double windings by a first and second inverters, the motor control method comprising:
flowing a first drive current for driving a first winding of the three-phase motor by the first inverter,
flowing a second driving current for driving a second winding of the three-phase motor by the second inverter, and
notifying operation states of the first and second inverters each other,
wherein the first inverter changes the first drive current based on the notified operating state of the second inverter,
wherein the first inverter further includes a first power transistor,
wherein the second inverter further includes a second power transistor,
wherein the first inverter controls a gate of the first power transistor by a PWM (Pulse Width Modulation) signal, and
wherein the second inverter controls a gate of the second power transistor by a PWM signal.

8. The motor control method according to claim 7, wherein when the second inverter is in an abnormal state, the first inverter adds the second drive current to the first drive current.

9. The motor control method according to claim 7,
wherein each of the first and second inverters have a temperature detection circuit,
wherein the first and second inverters change the first and second drive currents based on temperatures indicated by the temperature detection circuits.

10. The motor control method according to claim 9, wherein the first and second inverters generate the first and second drive currents so that a ratio of the first drive current and the second drive current is a predetermined ration based on the temperatures indicated by the temperature detection circuits.

11. The motor control method according to claim 7, wherein a timing at which the first inverter generates the PWM signal and a timing at which the second inverter generates the PWM signal is shifted by a predetermined amount.

* * * * *